(12) United States Patent
Schuelke (10) Patent No.: US 12,480,624 B2
(45) Date of Patent: Nov. 25, 2025

(54) GAS STORAGE SYSTEM

(71) Applicant: Robert Bosch GmbH, Stuttgart (DE)

(72) Inventor: Armin Schuelke, Aidlingen (DE)

(73) Assignee: Robert Bosch GmbH, Stuttgart (DE)

( * ) Notice: Subject to any disclaimer, the term of this patent is extended or adjusted under 35 U.S.C. 154(b) by 29 days.

(21) Appl. No.: 18/698,557

(22) PCT Filed: Sep. 26, 2022

(86) PCT No.: PCT/EP2022/076682
§ 371 (c)(1),
(2) Date: Apr. 4, 2024

(87) PCT Pub. No.: WO2023/072506
PCT Pub. Date: May 4, 2023

(65) Prior Publication Data
US 2024/0401751 A1 Dec. 5, 2024

(30) Foreign Application Priority Data

Oct. 28, 2021 (DE) .................. 10 2021 212 188.8

(51) Int. Cl.
*F17C 13/08* (2006.01)
(52) U.S. Cl.
CPC .... *F17C 13/084* (2013.01); *F17C 2205/0146* (2013.01); *F17C 2221/012* (2013.01);
(Continued)
(58) Field of Classification Search
CPC ............ F17C 13/084; F17C 2205/0146; F17C 2221/012; F17C 2270/0168;
(Continued)

(56) References Cited

U.S. PATENT DOCUMENTS

| 4,722,333 A | 2/1988 | Bartos |
| 4,832,376 A * | 5/1989 | Sugao ..................... F16L 41/12 |
| | | 285/133.11 |

(Continued)

FOREIGN PATENT DOCUMENTS

| DE | 102018201055 A1 | 7/2019 |
| EP | 1315933 A1 | 6/2003 |

(Continued)

OTHER PUBLICATIONS

Translation of International Search Report for Application No. PCT/EP2022/076682 dated Dec. 20, 2022 (4 pages).

*Primary Examiner* — Don M Anderson
*Assistant Examiner* — Laura E. Parker
(74) *Attorney, Agent, or Firm* — Michael Best & Friedrich LLP (57) ABSTRACT

The invention relates to a gas storage system (1) comprising gas storage units (2) which each have a connection end (4) which pressure-tightly connects said gas storage unit (2) to a shared connection structure (5).
In order to improve the gas storage system (1) with respect to its manufacturing process and/or function, a connecting sleeve (12) is associated with the connection end (4), a first sealing portion (13) of said connecting sleeve being fluid-tightly accommodated in the connection end (4) of the gas storage unit (2), and a second sealing portion (14) of the connecting sleeve (12) being fluid-tightly accommodated in a connection recess (9) in the shared connection structure (5).

8 Claims, 5 Drawing Sheets

(52) U.S. Cl.
CPC ............... *F17C 2270/0168* (2013.01); *F17C 2270/0184* (2013.01)

(58) Field of Classification Search
CPC ........ F17C 2270/0184; F17C 2205/013; F17C 2205/0134; F17C 2205/0373; F17C 2205/037; F17C 2205/03; F17C 2205/0302; F17C 2205/0352; F17C 2205/0367; F16L 17/02; F16L 19/02; F16L 19/0206; F16L 19/041; F16L 19/061; F16L 19/065; F16L 21/00; F16L 21/08
USPC .......................................... 220/581; 137/266
See application file for complete search history.

(56) References Cited

U.S. PATENT DOCUMENTS

| | | | |
|---|---|---|---|
| 6,206,027 B1 | 3/2001 | Ponnet et al. | |
| 6,708,719 B2 * | 3/2004 | Idoguchi | F17C 13/084 222/135 |
| 9,529,369 B2 | 12/2016 | Mayr et al. | |
| 10,655,646 B2 | 5/2020 | Chen et al. | |
| 2011/0272048 A1 | 11/2011 | Glaeser et al. | |
| 2014/0130896 A1 * | 5/2014 | Mayr | F17C 13/002 137/263 |
| 2020/0300397 A1 | 9/2020 | Clifford et al. | |
| 2023/0058291 A1 * | 2/2023 | Criel | F17C 13/084 |
| 2023/0408040 A1 * | 12/2023 | Gutmann | F17C 13/084 |

FOREIGN PATENT DOCUMENTS

| | | |
|---|---|---|
| EP | 2650585 A1 | 10/2013 |
| EP | 2742272 B1 | 4/2016 |
| EP | 3037712 A1 | 6/2016 |
| WO | 2021110707 A1 | 6/2021 |

* cited by examiner

GAS STORAGE SYSTEM

BACKGROUND

The invention relates to a gas storage system comprising gas storage units which each have a connection end which pressure-tightly connects said gas storage unit to a shared connection structure.

The use of a gas storage system in a motor vehicle is known from German Disclosure document DE 10 2018 201 055 A1, wherein the gas storage system comprises at least two storage units which are connected to an outlet line via a line system.

SUMMARY

The task of the invention is to improve the manufacturing and/or functional aspects of a gas storage system with gas storage units, each of which has a connection end with which the respective gas storage unit is connected in a pressure-tight manner to a shared connection structure.

The problem is solved in a gas storage system with gas storage units which each have a connection end with which the respective gas storage unit is connected in a pressure-tight manner to a shared connection structure, in that the connection end is associated with a connecting sleeve which is accommodated with a first sealing portion in a fluid-tight manner in the connection end of the gas storage unit, the connecting sleeve being accommodated with a second sealing portion in a fluid-tight manner in a connection recess of the shared connection structure. The connecting sleeve is used, for example, to create a fluid-tight plug-in connection between the connection end of the gas storage unit and the shared connection structure. However, the connecting sleeve can also be connected to the connection end of the gas storage unit or to the shared connection structure in a form-fitting, material-fitting or, if necessary, in a one piece manner. The gas storage system is preferably a mobile high-pressure storage system, in particular a mobile hydrogen storage system of a motor vehicle. The vehicle is powered, at least in part, by gas. The motor vehicle is particularly advantageously equipped with a hydrogen drive system comprising fuel cells in which hydrogen is converted to generate electricity to operate an electric drive motor. The gas, especially the hydrogen, is stored in the gas storage units under high pressure. This is why the gas storage units, which are designed as gas cylinders, for example, are themselves very stable and rigid. The connecting sleeve decouples a sealing function between the gas storage units and the shared connection structure from a fastening function. The fastening function is advantageously realized independently of the sealing function with the aid of a tensioning device described below.

A preferred exemplary embodiment of the gas storage system is characterized in that the connecting sleeve has at least one plug-in connection end with a seal. The seal is designed as an O-ring, for example, which is arranged in an annular groove at the plug-in connection end. The connecting sleeve can also have two plug-in connection ends. The plug-in connection end simplifies the assembly of the connecting sleeve.

A further preferred exemplary embodiment of the gas storage system is characterized in that a clearance is provided between the first sealing portion and the connection end of the gas storage unit, which makes it possible to compensate for manufacturing-related angular errors between the connection end and the connection recess of the shared connection structure. This is particularly advantageous if the gas storage units and the shared connection structure are manufactured in different production plants.

A further preferred exemplary embodiment of the gas storage system is characterized in that at least one force application body for a tensioning device is formed at the connection end of the gas storage unit. According to an exemplary embodiment, the tensioning device is designed for applications with lower pressures and smaller gas storage units in a similar way to a known bottle lever closure. In this exemplary embodiment, the tensioning device comprises at least one toggle arm, which is pivotably attached to the tensioning device. The toggle lever arm, in conjunction with the force application body on the gas storage unit, enables stable tensioning of the gas storage unit relative to the shared connection structure in a simple manner. According to a further exemplary embodiment, the tensioning device can also be designed in the form of a bayonet for higher pressures and larger gas storage units. The gas storage unit can then be fastened to the shared connection structure by twisting it like a bayonet catch. To fasten it to the shared connection structure, the gas storage unit is rotated relative to the shared connection structure after it has been attached in order to brace the gas storage unit relative to the shared connection structure. This type of fastening is simple and inexpensive to implement.

A further preferred exemplary embodiment of the gas storage system is characterized in that the force application body has a latching lug which engages in a latching recess on the tensioning device when the gas storage unit is correctly mounted. This is a simple way of avoiding unwanted incorrect installation.

Another preferred exemplary embodiment of the gas storage system is characterized in that the tensioning device comprises a fastening sleeve with a recess through which the shared connection structure extends. The fastening sleeve at least partially surrounds the shared connection structure. Depending on the design of the fastening sleeve, the shared connection structure is inserted through the recess in the fastening sleeve or inserted from one side into the recess in the fastening sleeve, which is open on one side. The recess in the fastening sleeve simplifies the installation of several gas storage units, each of which is associated with a fastening sleeve, on or at the shared connection structure.

A further preferred exemplary embodiment of the gas storage system is characterized in that the recess is designed as a through opening in the fastening sleeve, the tensioning device comprising a support bolt which is supported in the recess on the fastening sleeve and which has a threaded through hole into which a clamping screw is screwed, which is tightened against the shared connection structure with a free end from a side facing away from the gas storage unit. The clamping screw can be used to securely fix the gas storage unit, which has been pre-assembled using the tensioning device described above, to the shared connection structure. This reliably prevents unwanted detachment of the gas storage unit from the shared connection structure during operation of a motor vehicle equipped with the gas storage system.

A further preferred exemplary embodiment of the gas storage system is characterized in that the recess has a U-shape open on one side with a first limb for receiving the connection end of the gas storage unit and a second limb which has a through hole provided with a thread, into which a clamping screw is screwed, which is tightened against the shared connection structure with a free end from a side facing away from the gas storage unit. The clamping screw can be used to securely fix the gas storage unit, which has been pre-assembled using the tensioning device described above, to the shared connection structure. This reliably prevents unwanted detachment of the gas storage unit from the shared connection structure during operation of a motor vehicle equipped with the gas storage system.

A further preferred exemplary embodiment of the gas storage system is characterized in that the connecting sleeve is combined with a screw bolt having at a first end, in addition to the first sealing portion, an externally threaded portion which is complementary to an internally threaded portion in the connection end of the gas storage unit, the screw bolt having at a second end a tensioning head, with which the shared connection structure is braced against the connection end of the gas storage unit when the screw bolt is tightened, the screw bolt comprising, between the first and the second end, a connecting portion with at least one fluid channel which connects the gas storage unit to the shared connection structure and which has a third sealing portion in addition to the second sealing portion. The third sealing portion, together with the second sealing portion, serves to seal the fluid channel or an interface between the fluid channel and the shared connection structure. The combination of the connecting sleeve with the screw bolt has the advantage that fewer parts are required.

The invention also relates to a connection structure, a connecting sleeve, a tensioning device, a fastening sleeve, a clamping screw, and/or a screw bolt for a gas storage system described above. The mentioned parts can be procured separately.

The invention may also relate to a method for assembling a gas storage system described above. Advantageously, several gas storage units are each mounted and fixed to a shared connection structure using a tensioning device, in particular a fastening sleeve, and a clamping screw.

Further advantages, features, and details of the invention arise from the following description, in which various exemplary embodiments are described in detail with reference to the drawing.

DETAILED DESCRIPTION

FIGS. 1 through 5 show various views of exemplary embodiments of a gas storage system 1. Gas storage system 1 is a mobile pressurized hydrogen storage system. In contrast to the illustration, the mobile pressurized hydrogen storage system comprises several gas storage units 2, each of which is connected to a shared connection structure 5 via a connection end 4. The gas storage units 2 are, for example, gas cylinders 3. The gas cylinders 3 are made of a steel material, for example.

The gas storage system 1 is used in a fuel cell vehicle to provide fuel in the form of hydrogen under high pressure. The gas storage units 2 are connected to each other via the shared connection structure 5. The shared connection structure 5 is also referred to as rail 6.

Figure 1:
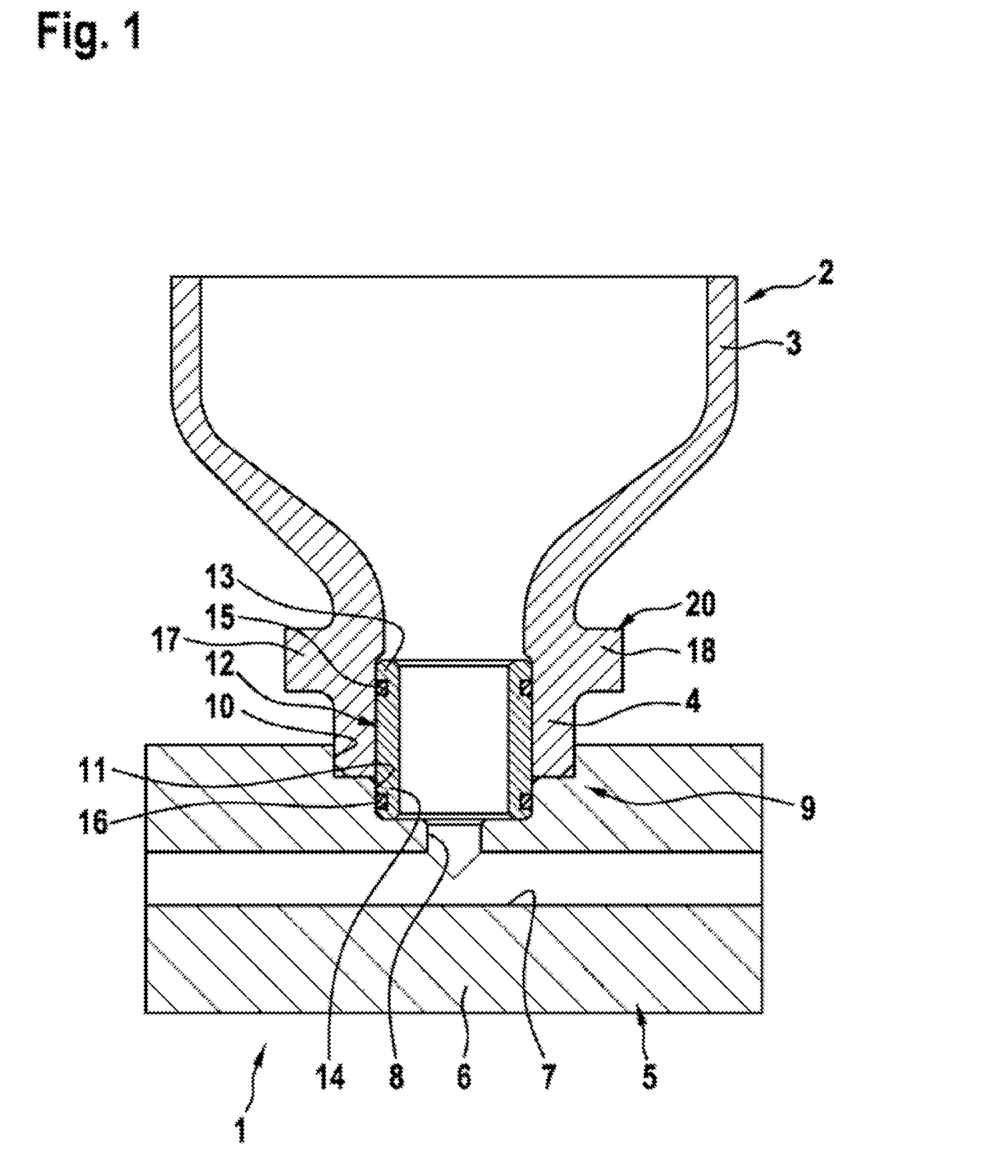
FIG. 1 is a sectional view of a gas storage system with a gas storage unit which is connected to a connection structure in a pressure-tight manner with a connection end with the interposition of a connecting sleeve, according to a first exemplary embodiment.

In the connection between the gas storage unit 2 and the shared connection structure 5, a connecting sleeve 12 with a first sealing portion 13 and a second sealing portion 14 is used for sealing. As can be seen in FIG. 1, the connecting sleeve 12 has the shape of a straight circular cylindrical shell.

The connecting sleeve 12 is arranged with the first sealing portion 13 in the connection end 4 of the gas storage unit 2. A first seal 15 designed as an O-ring is arranged in an annular groove in the connecting sleeve 12 and provides a seal between the connecting sleeve 12 and the connection end 4 of the gas cylinder 3 in the first sealing portion 13. The first sealing portion 13 is provided at an upper end of the connecting sleeve 12 in FIG. 1.

The second sealing portion 14 is provided at a lower end of the connecting sleeve 12 in FIG. 1. The second sealing portion 14 accommodates the connecting sleeve 12 in a connection recess 9 of the rail 6. A connection line 8 extends from the connection recess 9 and leads into a connection line 7 of the rail 6.

The connection recess 9 comprises a receiving portion 10, which has a larger diameter than a receiving portion 11, which in turn has a larger diameter than the connection line 8 in the rail 6. The connection end 4 of the gas cylinder 3 is accommodated in the receiving portion 10. The second sealing portion 14 of the connecting sleeve 12 is accommodated in the receiving portion 11.

For sealing between the rail 6 and the connecting sleeve 12, a second seal 16 is arranged in an annular groove of the connecting sleeve 12. The stepped design of the connection recess 9 with the receiving portions 10 and 11 and the connection line 8 advantageously creates stops for the connection end 4 and the lower end of the connecting sleeve 12 in the rail 6 in FIG. 1.

The connecting sleeve 12 with the seals 15, 16, for example in the form of O-rings, provides a pressure-tight seal in the gas cylinder 3 and in the rail 6. In the exemplary embodiment shown, the connecting sleeve 12 is plugged in on both sides. Alternatively, one end of the connecting sleeve 12 can be connected to the gas cylinder 3 or to the rail 6 with a positive or material connection.

The connecting sleeve 12 with the seals 15, 16 provides the great advantage that a clearance can be provided between the connecting sleeve 12 and the gas cylinder 3. This play between the gas cylinder 3 and the connecting sleeve 12 can compensate for angular errors.

The gas cylinder 3 is advantageously fastened to the rail 6 independently of the connecting sleeve 12. The gas cylinder 3 is fastened to the rail 6, for example, with a tensioning device 20, which is only indicated by a reference sign in FIG. 1 and engages with force application bodies 17, 18 that are formed on the gas cylinder 3. The force application bodies 17, 18 can be parts of a collar that is formed at the connection end 4 of the gas cylinder 3.

Figure 2:
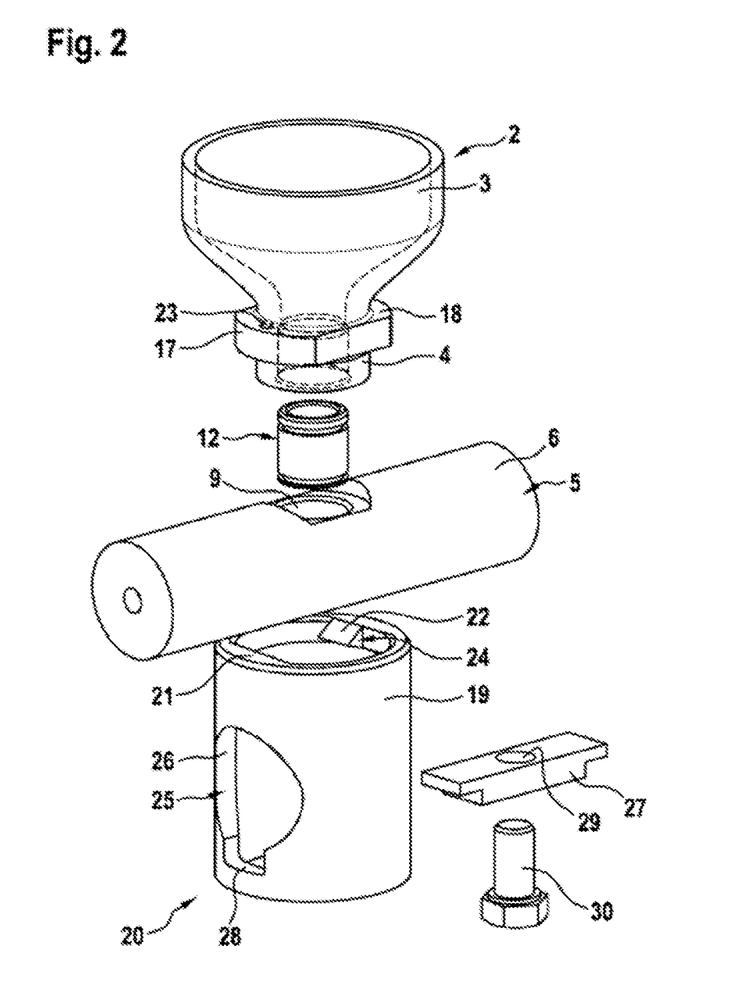
FIG. 2 is an exploded view of the gas storage system from FIG. 1 with a tensioning device and a clamping screw.
Figure 3:
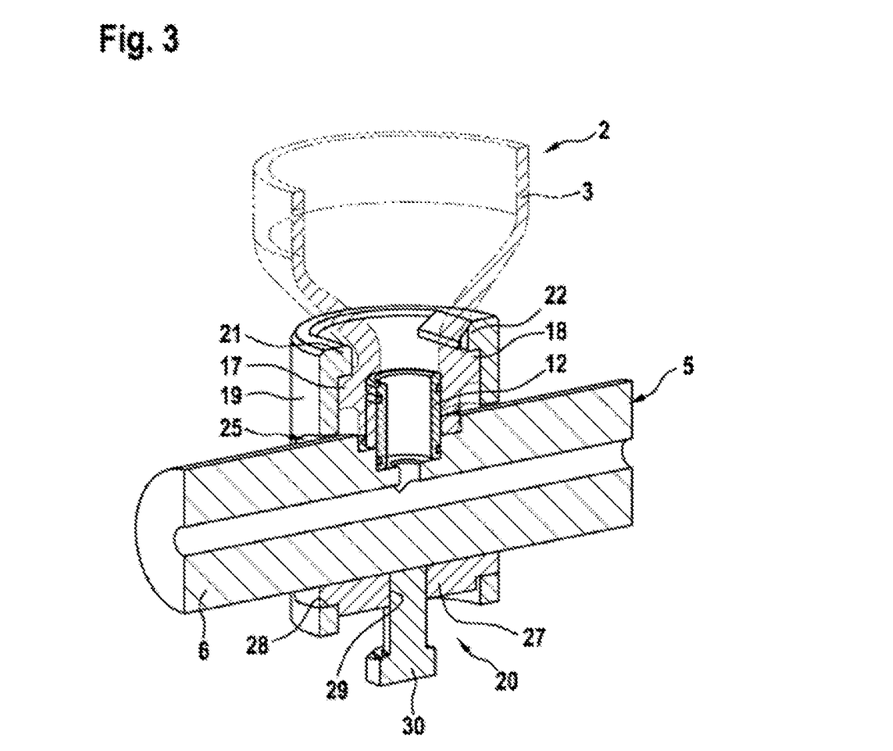
FIG. 3 is a sectional view of the assembled gas storage system from FIG. 2.

FIGS. 2 and 3 show how the gas cylinder 3 is fastened to the rail 6 with the aid of the tensioning device 20, which in FIGS. 2 and 3 engages the force application bodies 17, 18 from above. In FIGS. 2 and 3, the tensioning device 20 is supported from below on the rail 6.

The tensioning device 20 comprises a fastening sleeve 19 with a support bolt 27. At its upper end in FIGS. 2 and 3, the fastening sleeve 19 has radially inner positive locking bodies 21, 22, which interact in a bayonet lock-like manner with the force application bodies 17, 18 at the connection end 4 of the gas cylinder 3.

To fasten the gas cylinder 3 to the rail 6, the gas cylinder 3 is inserted with the connection end 4, for example in FIG. 2, from above into the fastening sleeve 19 and rotated through ninety degrees. Incorrect installation is advantageously prevented by at least one latching lug 23 on the connection end 4 of the gas cylinder 3, which engages in a latching recess 24 on the fastening sleeve 19.

The fastening sleeve 19 comprises a recess 25, which in FIGS. 2 and 3 is designed as a through opening 26 for the rail 6. Before mounting the gas cylinder 3, the rail 6 is inserted through the through opening 26 of the fastening sleeve 19. Before the gas cylinder 3 is fastened to the rail 6, the connecting sleeve 12 is inserted into the connection end 4 of the gas cylinder 3 or into the connection recess 9 of the rail 6. The gas cylinder 3 is then brought together with the rail 6, wherein the connecting sleeve 12 develops its sealing effect. The bayonet catch, which is shown with the force application bodies 17, 18 and the positive locking bodies 21, 22, is then closed until the latching lug 23 engages in the latching recess 24.

The connection between the gas cylinder 3 and the rail 6 can then be additionally fixed with a clamping screw 30, which interacts with the support bolt 27. The support bolt 27 is inserted into a groove 28 at the lower end of the through opening 26 of the fastening sleeve 19 in FIG. 2.

The support bolt 27 comprises a threaded through hole 29 through which the clamping screw 30 is screwed. FIG. 3 shows how the clamping screw 30 presses against the rail 6 from below when it is screwed into the through hole 29 of the support bolt 27 in FIG. 3 in order to securely fix the tensioning device 20. This holds the gas cylinder 3 securely on the rail 6.

Figure 4:
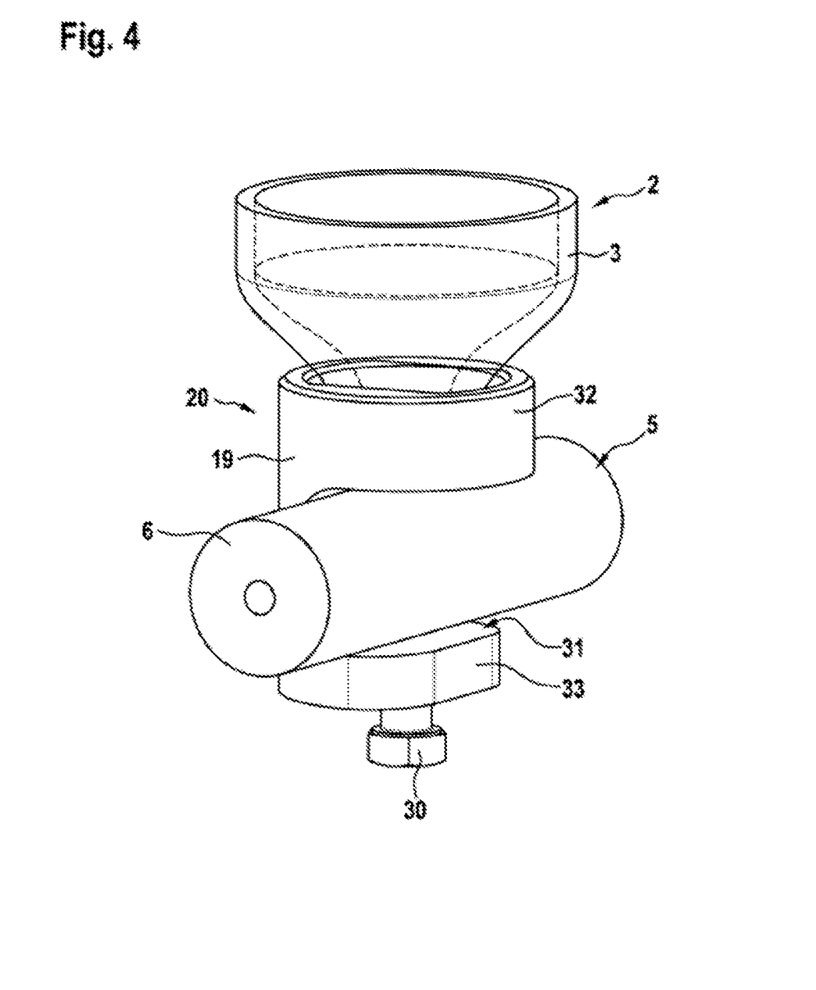
FIG. 4 is a perspective view of a variant of the gas storage system shown in FIG. 3.

FIG. 4 shows a variant of the exemplary embodiment of FIGS. 2 and 3, wherein the fastening sleeve 19 has a U-shaped recess 31 open on one side with a first limb 32 and a second limb 33. This design, which is open on one side, has the advantage that the fastening sleeve 19 can be pushed over the rail 6 at a later stage. This means that several gas cylinders 3 can be individually fitted to a rail 6, in particular replaced, without having to remove all the gas cylinders 3.

The gas cylinders 3 can also be exchanged in the exemplary embodiments shown in FIGS. 1 through 3. The fastening sleeve 19 is then advantageously not removable.

The bayonet-type fastening of the gas cylinder 3 to the first limb 32 functions in the same or a similar way as in the exemplary embodiment shown in FIGS. 2 and 3. In contrast, the support bolt (27 in FIGS. 2 and 3) is integrated into the second limb 33 of the fastening sleeve 19. The clamping screw 30 for fixing the tensioning device 20 functions in the same way as in the exemplary embodiment shown in FIGS. 2 and 3.

Figure 5:
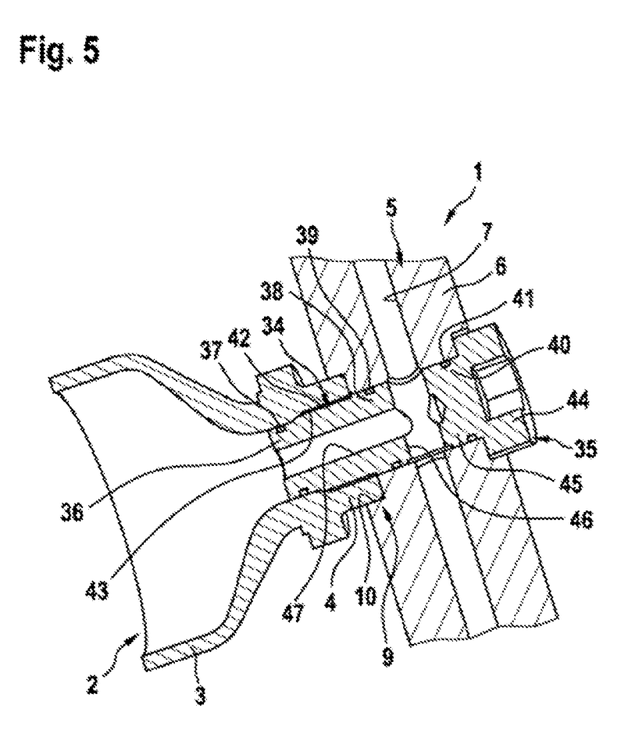
FIG. 5 is a sectional view of another exemplary embodiment of a gas storage system in which the connecting sleeve is combined with a screw bolt.

FIG. 5 shows an exemplary embodiment in which the gas cylinder 3 is screwed from the rear, i.e., from the side of the rail 6 facing away from the gas cylinder 3, with the aid of a screw bolt 35 into which a connecting sleeve 34 is integrated.

The connecting sleeve 34 comprises a first sealing portion 36 with a first seal 37, which is designed as an O-ring. The first sealing portion 36 with the first seal 37 is provided at an end of the screw bolt 35 located in the connection end 4 of the gas cylinder 3 in FIG. 5. Axially adjacent to the first sealing portion 36, the screw bolt 35 has an externally threaded portion 32, with which the screw bolt 35 is screwed into an internally threaded portion 43 in the connection end 4 of the gas cylinder 3.

Axially adjacent to the externally threaded portion 42, the screw bolt 35 has a second sealing portion 38 with a second seal 39. Between the second sealing portion 38 and a third sealing portion 40 with a third seal 41, the screw bolt 35 has a connecting portion 45. In the connecting portion 45, the screw bolt 35 comprises a fluid channel 46, which forms part of the connection line 7 in the assembled rail 6.

A fluid channel 47 extends from the fluid channel 46 through the screw bolt 35 into the interior of the gas cylinder 3. At its end facing away from the gas cylinder 3, the screw bolt 35 has a tensioning head 44, which is supported on the rail 6 when the screw bolt 35 is screwed into the connection end 4 of the gas cylinder 3.

During assembly, the screw bolt 35 is inserted through the rail 6 and screwed into the gas cylinder 3. When the screw bolt 35 is tightened, the gas cylinder 3 is pulled firmly against the rail 6 with its connection end 4.

The invention claimed is:

1. A gas storage system (1) having gas storage units (2) which each have a connection end (4) with which the respective gas storage unit (2) is connected in a pressure-tight manner to a shared connection structure (5), wherein the connection end (4) is associated with a connecting sleeve (12; 34), which is accommodated with a first sealing portion (13; 36) in a fluid-tight manner in the connection end (4) of the gas storage unit (2), wherein the connecting sleeve (12; 34) is accommodated with a second sealing portion (14; 38) in a fluid-tight manner in a connection recess (9) of the shared connection structure (5), wherein at least one force application body (17, 18) for a tensioning device (20) is formed at the connection end (4) of the gas storage unit (2), wherein the force application body (17, 18) has a latching lug (23) which engages in a latching recess (24) on the tensioning device (20) when the gas storage unit (2) is correctly mounted, and wherein the tensioning device (20) comprises a fastening sleeve (19) with a recess (25; 31) through which the shared connection structure (5) extends.

2. The gas storage system according to claim 1, wherein the connecting sleeve (12; 34) has a plug-in connection end with a seal (15, 16; 37).

3. The gas storage system according to claim 1, wherein a clearance is provided between the first sealing portion (13; 36) and the connection end (4) of the gas storage unit (2), which clearance makes it possible to compensate for production-related angular errors between the connection end (4) and the connection recess (9) of the shared connection structure (5).

4. The gas storage system according to claim 1, wherein the connecting sleeve (34) is combined with a screw bolt (35) having an externally threaded portion (42) which is configured to be complementary to an internally threaded portion (43) in the connection end (4) of the gas storage unit (2), wherein the first sealing portion (36) is provided at a first end of the screw bolt (35), wherein the screw bolt (35) has a tensioning head (44) at a second end, with which the shared connection structure (5) is braced against the connection end (4) of the gas storage unit (2) when the screw bolt (35) is tightened, wherein the screw bolt (35) comprises a connecting portion (45) between the first and the second end with at least one fluid channel (46, 47), the at least one fluid channel (46, 47), connects the gas storage unit (2) to the shared connection structure (5), wherein the screw bolt (35) includes a third sealing portion (40) with a third seal (41).

5. The gas storage system according to claim 1, wherein the recess (25) is configured as a through opening (26) in the fastening sleeve (19), the tensioning device (20) comprising a support bolt (27), which is supported in the recess (25) on the fastening sleeve (19) and which has a through hole (29) which is provided with a thread and into which a clamping screw (30) is screwed, which is tightened against the shared connection structure (5) with a free end from a side facing away from the gas storage unit (2).

6. The gas storage system according to claim 1, wherein the recess (31) has a U-shape open on one side with a first limb (32) for receiving the connection end (4) of the gas storage unit (2) and a second limb (33) which has a through hole provided with a thread, into which a clamping screw (30) is screwed, which is tightened with a free end from a side facing away from the gas storage unit (2) against the shared connection structure (5).

7. A gas storage system (1) having gas storage units (2) which each have a connection end (4) with which the respective gas storage unit (2) is connected in a pressure-tight manner to a shared connection structure (5), wherein the connection end (4) is associated with a connecting sleeve (12; 34), which is accommodated with a first sealing portion (13; 36) in a fluid-tight manner in the connection end (4) of the gas storage unit (2), wherein the connecting sleeve (12; 34) is accommodated with a second sealing portion (14; 38) in a fluid-tight manner in a connection recess (9) of the shared connection structure (5), wherein at least one force application body (17, 18) for a tensioning device (20) is formed at the connection end (4) of the gas storage unit (2), wherein the tensioning device (20) comprises a fastening sleeve (19) with a recess (25; 31) through which the shared connection structure (5) extends, wherein the recess (25) is configured as a through opening (26) in the fastening sleeve (19), the tensioning device (20) comprising a support bolt (27), which is supported in the recess (25) on the fastening sleeve (19) and which has a through hole (29) which is provided with a thread and into which a clamping screw (30) is screwed, which is tightened against the shared connection structure (5) with a free end from a side facing away from the gas storage unit (2).

8. A gas storage system (1) having gas storage units (2) which each have a connection end (4) with which the respective gas storage unit (2) is connected in a pressure-tight manner to a shared connection structure (5), wherein the connection end (4) is associated with a connecting sleeve (12; 34), which is accommodated with a first sealing portion (13; 36) in a fluid-tight manner in the connection end (4) of the gas storage unit (2), wherein the connecting sleeve (12; 34) is accommodated with a second sealing portion (14; 38) in a fluid-tight manner in a connection recess (9) of the shared connection structure (5), wherein at least one force application body (17, 18) for a tensioning device (20) is formed at the connection end (4) of the gas storage unit (2), wherein the tensioning device (20) comprises a fastening sleeve (19) with a recess (25; 31) through which the shared connection structure (5) extends, wherein the recess (31) has a U-shape open on one side with a first limb (32) for receiving the connection end (4) of the gas storage unit (2) and a second limb (33) which has a through hole provided with a thread, into which a clamping screw (30) is screwed, which is tightened with a free end from a side facing away from the gas storage unit (2) against the shared connection structure (5).

* * * * *